(12) United States Patent
Lainema

(10) Patent No.: US 12,542,916 B2
(45) Date of Patent: Feb. 3, 2026

(54) APPARATUS, A METHOD AND A COMPUTER PROGRAM FOR CROSS-COMPONENT PARAMETER CALCULATION

(71) Applicant: Nokia Technologies Oy, Espoo (FI)

(72) Inventor: Jani Lainema, Tampere (FI)

(73) Assignee: Nokia Technologies Oy, Espoo (FI)

( * ) Notice: Subject to any disclaimer, the term of this patent is extended or adjusted under 35 U.S.C. 154(b) by 90 days.

(21) Appl. No.: 18/577,027

(22) PCT Filed: Jun. 22, 2022

(86) PCT No.: PCT/FI2022/050452
§ 371 (c)(1),
(2) Date: Jan. 5, 2024

(87) PCT Pub. No.: WO2023/281158
PCT Pub. Date: Jan. 12, 2023

(65) Prior Publication Data
US 2024/0314336 A1    Sep. 19, 2024

(30) Foreign Application Priority Data

Jul. 6, 2021 (FI) .................................... 20215786

(51) Int. Cl.
*H04N 19/186* (2014.01)
*H04N 19/176* (2014.01)
*H04N 19/50* (2014.01)

(52) U.S. Cl.
CPC ......... *H04N 19/186* (2014.11); *H04N 19/176* (2014.11); *H04N 19/50* (2014.11)

(58) Field of Classification Search
CPC .. H04N 19/196; H04N 19/132; H04N 19/159; H04N 19/176

(Continued)

(56) References Cited

U.S. PATENT DOCUMENTS

| 11,405,609 B2 * | 8/2022 | Chen | H04N 19/157 |
| 12,425,631 B2 * | 9/2025 | Xu | H04N 19/186 |

(Continued)

FOREIGN PATENT DOCUMENTS

| GB | 2580106 A | 7/2020 |
| WO | 2020/096877 A1 | 5/2020 |

(Continued)

OTHER PUBLICATIONS

Office action received for corresponding Japanese Patent Application No. 2024-500116, dated Jan. 14, 2025, 3 pages of office action and 2 pages of summary available.

(Continued)

*Primary Examiner* — Albert Kir
(74) *Attorney, Agent, or Firm* — McCarter & English LLP

(57) ABSTRACT

A method comprising: calculating at least two parameters (a, b) that define a mapping from a first color component (Y) to a second color component (Cb/Cr), the at least two parameters (a, b) including at least a slope parameter (a) and an offset parameter (b); determining an update term (u) to the slope parameter (a); applying the update term (u) to the slope parameter (a) by adding the update term (u) to the value of the slope parameter (a) to generate an updated slope parameter (a); determining a reference value (yr) of first color component (Y); and calculating an updated offset parameter (b) based on the reference value (yr) of the first color component (Y) and the updated slope parameter (a')

20 Claims, 7 Drawing Sheets

(58) Field of Classification Search
USPC .................................................. 375/240.12
See application file for complete search history.

(56) References Cited

U.S. PATENT DOCUMENTS

| | | | |
|---|---|---|---|
| 2016/0219283 | A1 | 7/2016 | Chen et al. |
| 2020/0154115 | A1* | 5/2020 | Ramasubramonian ...................... H04N 19/176 |
| 2022/0070491 | A1* | 3/2022 | Yasugi ................... H04N 19/42 |
| 2022/0150538 | A1* | 5/2022 | Choi .................... H04N 19/186 |
| 2024/0129458 | A1* | 4/2024 | Chang ................... H04N 19/136 |
| 2024/0236326 | A1* | 7/2024 | Chen .................... H04N 19/105 |
| 2025/0267297 | A1* | 8/2025 | Naser ................... H04N 19/103 |

FOREIGN PATENT DOCUMENTS

| | | |
|---|---|---|
| WO | 2020/184294 A1 | 9/2020 |
| WO | 2020258016 A1 | 12/2020 |
| WO | 2023146689 A1 | 8/2023 |

OTHER PUBLICATIONS

Laroche et al., "Non-CE3: On cross-component linear model simplification", Sony Corporation, Joint Video Experts Team (JVET) of ITU-T SG 16 WP 3 and ISO/IEC JTC 1/SC 29, JVET-K0204-v3, 11th Meeting, Jul. 10-18, 2018, pp. 1-7.

"Video Coding For Low Bit Rate Communication", Series H: Audiovisual And Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual And Multimedia Systems, Infrastructure of audiovisual services—Coding of moving Video, Recommendation ITU-T H.264, Apr. 2017, 812 pages.

"High Efficiency Video Coding", Series H: Audiovisual and Multimedia Systems, Infrastructure of audiovisual services—Coding of moving video, Recommendation ITU-T H.265, Feb. 2018, 692 pages.

"Versatile Video Coding", Series H: Audiovisual and Multimedia Systems Infrastructure of audiovisual services—Coding of moving video, Recommendation ITU-T H.266, Aug. 2020, 516 pages.

Zhang et al., "Enhanced Cross-component Linear Model Intra-prediction", Qualcomm Incorporated, Joint Video Exploration Team (JVET) of ITU-T SG 16 WP 3 and ISO/IEC JTC 1/SC 29/WG 11, JVET-D0110, Oct. 15-21, 2016, pp. 1-6.

"IEEE 802.11", Wikipedia, Retrieved on Feb. 26, 2024, Webpage available at : https://en.wikipedia.org/wiki/IEEE_802.11.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 15: Advanced Video Coding (AVC) File Format", ISO/IEC 14496-15, First edition, Apr. 15, 2004, 29 pages.

"Parameter Values for Ultra-High Definition Television Systems for Production And International Programme Exchange", Recommendation ITU-R BT.2020, Aug. 2012, 7 pages.

"Parameter Values for the HDTV Standards for Production and International Programme Exchange", Recommendation ITU-R BT.709-6, Jun. 2015, 19 pages.

Office Action received for corresponding Finnish Patent Application No. 20215786, dated Mar. 2, 2022, 9 pages.

Helmrich, "Improved robustness for calculation of cross-component linear model parameters", Fraunhofer HHI, Joint Video Experts Team (JVET) of ITU-T SG 16 WP 3 and ISO/IEC JTC 1/SC 29/WG 11, JVET-M0093-v1, Jan. 9-18, 2019, pp. 1-4.

Ikeda et al., "Non-CE3: Modified beta derivation in CCLM", Sony Corporation, Joint Video Experts Team (JVET) of ITU-T SG 16 WP 3 and ISO/IEC JTC 1/SC 29/WG 11, JVET-N0524-v3, Mar. 19-27, 2019, pp. 1-6.

International Search Report and Written Opinion received for corresponding Patent Cooperation Treaty Application No. PCT/FI2022/050452, dated Sep. 21, 2022, 17 pages.

Zhang et al., "Chroma Intra Prediction Based on Inter-Channel Correlation for Hevc", IEEE Transactions on Image Processing, vol. 23, No. 1, Jan. 2014, pp. 274-286.

Lainema et al., "AHG12: Slope adjustment for CCLM", Sony Corporation, Joint Video Experts Team (JVET) of ITU-T SG 16 WP 3 and ISO/IEC JTC 1/SC 29, JVET-Y0055-v1, 25th Meeting, Jan. 12-21, 2022, pp. 1-3.

Extended European Search Report received for corresponding European Patent Application No. 22837095.3, dated May 12, 2025, 7 pages.

* cited by examiner

APPARATUS, A METHOD AND A COMPUTER PROGRAM FOR CROSS-COMPONENT PARAMETER CALCULATION

RELATED APPLICATION

This application was originally filed as PCT Application No. PCT/FI2022/050452, filed on Jun. 22, 2022, which claims priority from FI Application No. 20215786, filed on Jul. 6, 2021, each of which is incorporated herein by reference in its entirety.

TECHNICAL FIELD

The present invention relates to an apparatus, a method and a computer program for cross-component parameter calculation in video coding and decoding.

BACKGROUND

In video coding, video and image samples are typically encoded using color representations such as YUV or YCbCr consisting of one luminance (luma) and two chrominance (chroma) channels. In these cases the luminance channel, representing mostly the illumination of the scene, is typically coded at certain resolution, while the chrominance channels, representing typically differences between certain color components, are often coded at a second resolution lower than that of the luminance signal. The intention of this kind of a differential representation is to decorrelate the color components and be able to compress the data more efficiently.

In Versatile Video Coding (VVC/H.266) standard, a Cross-Component Linear Model (CCLM) is used as a linear model for predicting the samples in the chroma channels (e.g. Cb and Cr). This process generates a linear model that can be used to map luma sample values to chroma sample values. The parameters of the linear model are constructed using the available reconstructed luma and chroma reference samples outside the borders of the prediction block. Once the parameters are constructed, the linear model specified by those parameters is used to predict chroma sample values inside the prediction block.

Applying a cross-component linear model prediction to predict chroma samples can be efficient compared to intra-component spatial prediction as the texture of the reconstructed luma block can sometimes generate a very good predictor for the chroma texture if there is a strong linear correlation between the luma and chroma channels. However, the reconstructed reference samples that are used to generate the linear model parameters can be noisy or those may not represent well the content inside the actual prediction block. In these cases the prediction fails and the process results in suboptimal coding efficiency for the content.

SUMMARY

Now in order to at least alleviate the above problems, an enhanced method for achieving a better correlation between the luma and chroma channels is introduced herein.

According to some aspects there is provided a method in which an update of one or more of the linear mode parameters is signaled. According to another aspect there is provided a method in which a signaled update to one or more of the linear mode parameters is received and the remaining parameters are adjusted based on the signaled update. Granularity of the update can advantageously be made adaptive to characteristics of a prediction block, such as the size of the block. It is also described how the update, or indication of presence of update information can be coded or decoded jointly for multiple blocks representing different color components.

An apparatus according to a first aspect comprises
means for calculating at least two parameters that define a mapping from a first color component to a second color component, the at least two parameters including at least a slope parameter and an offset parameter;
means for determining an update term to the slope parameter;
means for applying the update term to the slope parameter by adding the update term to the value of the slope parameter to generate an updated slope parameter;
means for determining a reference value of first color component; and
means for calculating an updated offset parameter based on the reference value of the first color component and the updated slope parameter.

In accordance with an embodiment the apparatus further comprises
means for determining a reference point consisting of a value pair of the first color component and the second color component; and
means for updating the slope parameter and the offset parameter based on the update term and the reference point.

In accordance with an embodiment the apparatus further comprises
means for selecting a control point from a line determined by the slope parameter and the offset parameter.

In accordance with an embodiment the apparatus further comprises
means for selecting a control point outside of a line determined by the slope parameter and the offset parameter.

In accordance with an embodiment the apparatus further comprises
means for determining an additional reference value of the first color component; and
means for using also the additional reference value to update the offset parameter.

In accordance with an embodiment of the apparatus said means for calculating at least two parameters that define a mapping are configured to use a plurality of pairs of values of the first color component and the second color component to determine the slope parameter and the offset parameter; and said means for determining an additional reference value are configured to use a combination of two or more values of the first color component of the pairs of values.

In accordance with an embodiment the apparatus further comprises a pre-determined set of update terms; and means for signalling the update terms in a bitstream.

In accordance with an embodiment of the apparatus the set of update terms that can be signalled in the bitstream depends on characteristics of a block of samples.

In accordance with an embodiment of the apparatus the first color component is a luma component and the second color component is one chroma component, further wherein said means for calculating at least two parameters that define a mapping for a current block are configured to calculate the offset term b' as: $b' = c_r - ((a * y_r) \gg k)$, where a is the slope parameter and k is a shifting parameter and:

$c_r$ is an average of border chroma values left of the current block, $y_r$ is an average of border luma values left of the current block, or $c_r$ is an average of border chroma values above the current block, $y_r$ is an average of border luma values above of the current block, or $c_r$ is an $_{average}$ of border chroma values left of and above the current block, $y_r$ is an average of border luma values left of and above the current block.

In accordance with an embodiment the apparatus is configured to perform one or more of the following:

selecting the set of reference luma and chroma values for calculating the cr and yr parameters to be larger than the set of reference luma and chroma values for calculating the slope parameter a;

selecting the set of reference luma and chroma values for calculating the cr and yr parameters for determining the offset parameter b' to be a superset of the set of reference luma and chroma values for calculating the slope parameter a.

In accordance with an embodiment the apparatus further comprises means for predicting the update term and a difference between an actual update term and the predicted update term.

In accordance with an embodiment of the apparatus said means for predicting are configured to determine the predicted update term from update terms or other parameters of spatially or temporally neighboring blocks of the current block, other blocks within the same or different pictures, or blocks of different color components or channels.

In accordance with an embodiment the apparatus further comprises means for receiving the update term from a bitstream.

In accordance with an embodiment the apparatus further comprises means for using linear model mapping for mapping luma values to chroma values to generate predicted chroma values based on decoded luma values.

A method according to a second aspect comprises calculating at least two parameters that define a mapping from a first color component to a second color component, the at least two parameters including at least a slope parameter and an offset parameter;

determining an update term to the slope parameter;

applying the update term to the slope parameter by adding the update term to the value of the slope parameter to generate an updated slope parameter;

determining a reference value of first color component; and calculating an updated offset parameter based on the reference value of the first color component and the updated slope parameter.

In accordance with an embodiment the method further comprises determining a reference point consisting of a value pair of the first color component and the second color component; and updating the slope parameter and the offset parameter based on the update term and the reference point.

In accordance with an embodiment the method further comprises selecting a control point from a line determined by the slope parameter and the offset parameter.

In accordance with an embodiment the method further comprises selecting a control point outside of a line determined by the slope parameter and the offset parameter.

In accordance with an embodiment the method further comprises determining an additional reference value of the first color component; and using also the additional reference value to update the offset parameter.

In accordance with an embodiment of the method said calculating at least two parameters that define a mapping uses a plurality of pairs of values of the first color component and the second color component to determine the slope parameter and the offset parameter; and said determining an additional reference value uses a combination of two or more values of the first color component of the pairs of values.

In accordance with an embodiment the method further comprises a pre-determined set of update terms; and signalling the update terms in a bitstream.

In accordance with an embodiment of the method the set of update terms that can be signalled in the bitstream depends on characteristics of a block of samples.

In accordance with an embodiment of the method the first color component is a luma component and the second color component is one chroma component, further wherein said calculating at least two parameters that define a mapping for a current block calculates the offset term b' as: $b' = c_r - ((a*y_r) \gg k)$, where a is the slope parameter and k is a shifting parameter and;

$c_r$ is an average of border chroma values left of the current block, $y_r$ is an average of border luma values left of the current block, or $c_r$ is an average of border chroma values above the current block, $y_r$ is an average of border luma values above of the current block, or $c_r$ is an $_{average}$ of border chroma values left of and above the current block, $y_r$ is an average of border luma values left of and above the current block.

In accordance with an embodiment the method further performs one or more of the following:

selects the set of reference luma and chroma values for calculating the cr and yr parameters to be larger than the set of reference luma and chroma values for calculating the slope parameter a;

selects the set of reference luma and chroma values for calculating the cr and yr parameters for determining the offset parameter b' to be a superset of the set of reference luma and chroma values for calculating the slope parameter a.

In accordance with an embodiment the method further comprises predicting the update term and a difference between an actual update term and the predicted update term.

In accordance with an embodiment of the method said predicting determines the predicted update term from update terms or other parameters of spatially or temporally neighboring blocks of the current block, other blocks within the same or different pictures, or blocks of different color components or channels.

In accordance with an embodiment the method further comprises receiving the update term from a bitstream.

In accordance with an embodiment the method further comprises using linear model mapping for mapping luma values to chroma values to generate predicted chroma values based on decoded luma values.

An apparatus according to a third aspect comprises at least one processor and at least one memory, said at least one memory stored with code thereon, which when executed by said at least one processor, causes the apparatus to perform at least:

calculate at least two parameters that define a mapping from a first color component to a second color component, the at least two parameters including at least a slope parameter and an offset parameter;

determine an update term to the slope parameter;

apply the update term to the slope parameter by adding the update term to the value of the slope parameter to generate an updated slope parameter;

determine a reference value of first color component; and calculate an updated offset parameter based on the reference value of the first color component and the updated slope parameter.

The apparatuses and the computer readable storage mediums stored with code thereon, as described above, are thus arranged to carry out the above methods and one or more of the embodiments related thereto.

BRIEF DESCRIPTION OF THE DRAWINGS

For better understanding of the present invention, reference will now be made by way of example to the accompanying drawings in which.

DETAILED DESCRIPTION OF SOME EXAMPLE EMBODIMENTS

Figure 1:
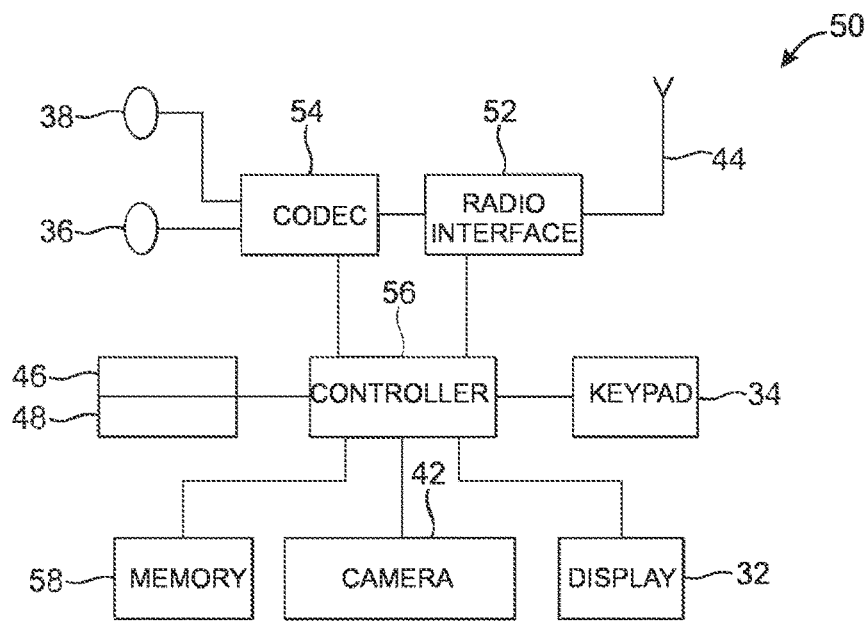
FIG. 1 shows schematically an electronic device employing embodiments of the invention.
Figure 2:
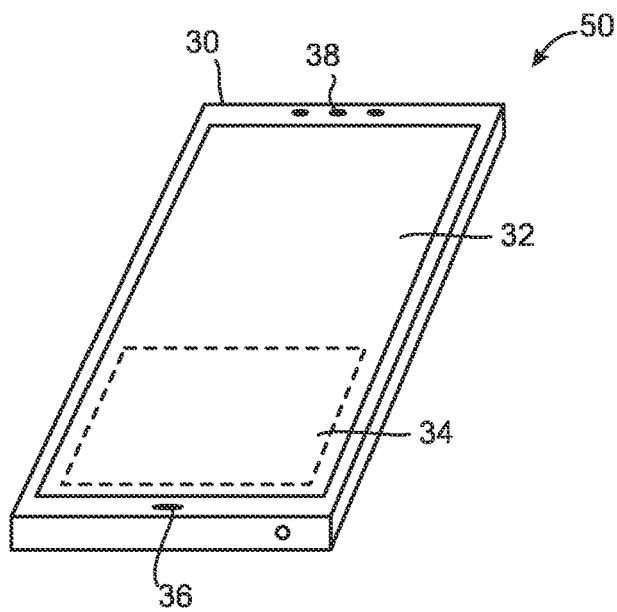
FIG. 2 shows schematically a user equipment suitable for employing embodiments of the invention.

The following describes in further detail suitable apparatus and possible mechanisms for initiating a viewpoint switch. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
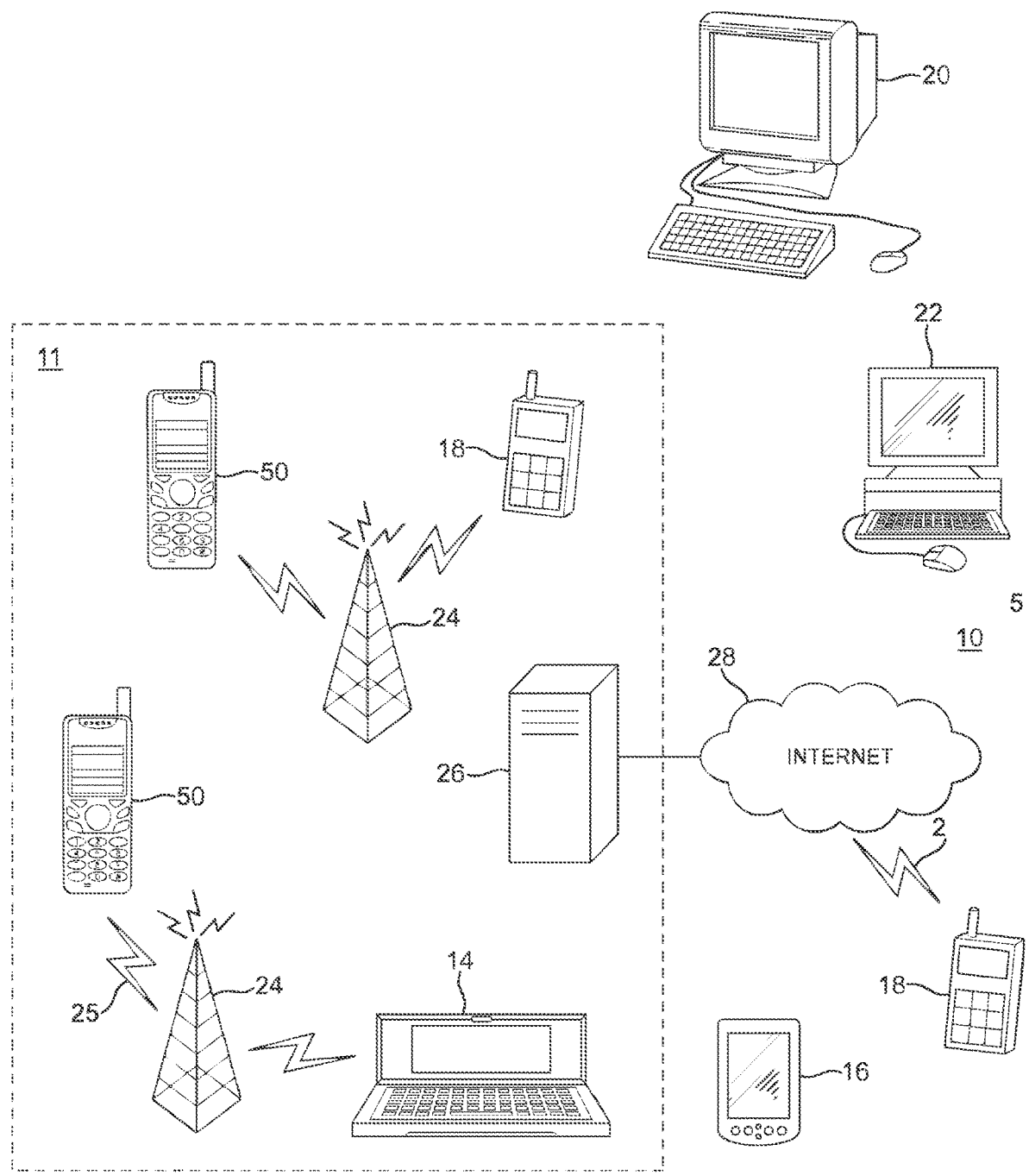
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Motion compensation can be performed either with full sample or sub-sample accuracy. In the case of full sample accurate motion compensation, motion can be represented as a motion vector with integer values for horizontal and vertical displacement and the motion compensation process effectively copies samples from the reference picture using those displacements. In the case of sub-sample accurate motion compensation, motion vectors are represented by fractional or decimal values for the horizontal and vertical components of the motion vector. In the case a motion vector is referring to a non-integer position in the reference picture, a sub-sample interpolation process is typically invoked to calculate predicted sample values based on the reference samples and the selected sub-sample position. The sub-sample interpolation process typically consists of horizontal filtering compensating for horizontal offsets with respect to full sample positions followed by vertical filtering compensating for vertical offsets with respect to full sample positions. However, the vertical processing can be also be done before horizontal processing in some environments.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4A:
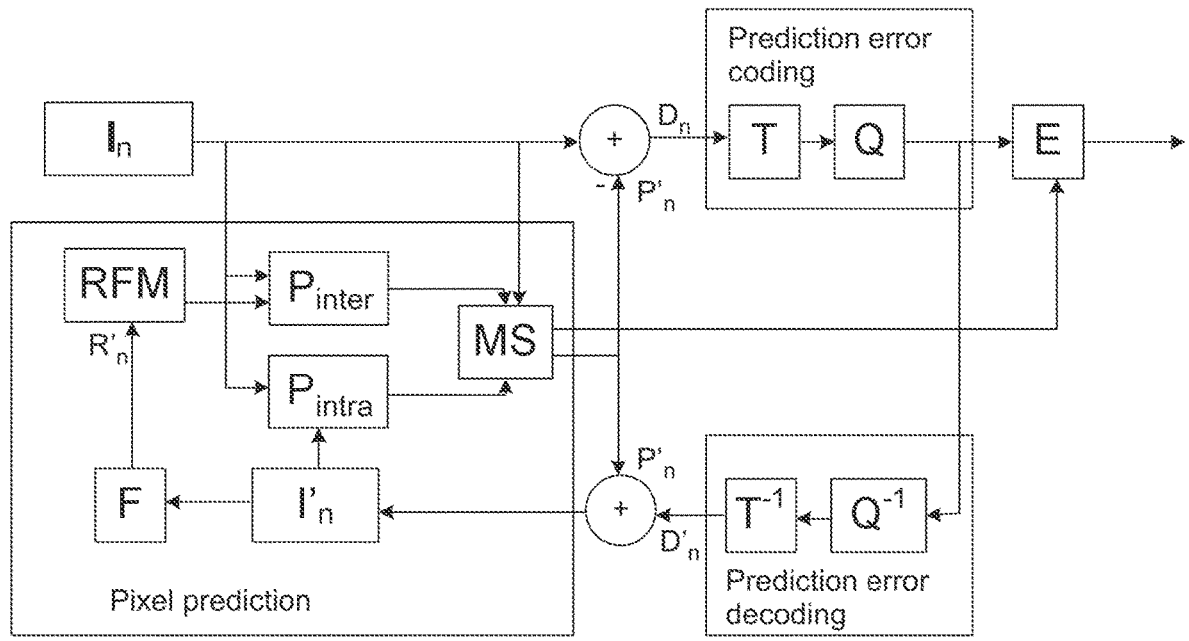
FIGS. 4a and 4b show schematically an encoder and a decoder suitable for implementing embodiments of the invention.
Figure 4B:
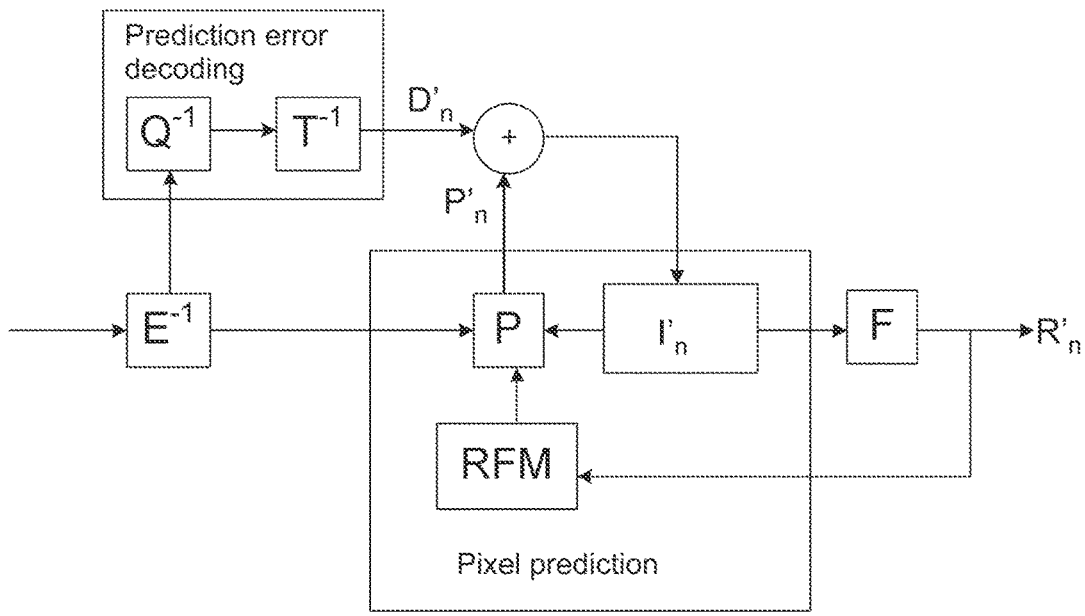

FIGS. 4a and 4b show an encoder and a decoder suitable for employing embodiments of the invention. A video codec consists of an encoder that transforms an input video into a compressed representation suited for storage/transmission and a decoder that can decompress the compressed video representation back into a viewable form. Typically, the encoder discards and/or loses some information in the original video sequence in order to represent the video in a more compact form (that is, at lower bitrate). An example of an encoding process is illustrated in FIG. 4a. FIG. 4a illustrates an image to be encoded (In); a predicted representation of an image block (P'n); a prediction error signal (Dn); a reconstructed prediction error signal (D'n); a preliminary reconstructed image (I'n); a final reconstructed image (R'n); a transform (T) and inverse transform (T-1); a quantization (Q) and inverse quantization (Q-1); entropy encoding (E); a reference frame memory (RFM); inter prediction (Pinter); intra prediction (Pintra); mode selection (MS) and filtering (F).

An example of a decoding process is illustrated in FIG. 4b. FIG. 4b illustrates a predicted representation of an image block (P'n); a reconstructed prediction error signal (D'n); a preliminary reconstructed image (I'n); a final reconstructed image (R'n); an inverse transform (T-1); an inverse quantization (Q-1); an entropy decoding (E-1); a reference frame memory (RFM); a prediction (either inter or intra) (P); and filtering (F).

Many hybrid video encoders encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate). Video codecs may also provide a transform skip mode, which the encoders may choose to use. In the transform skip mode, the prediction error is coded in a sample domain, for example by deriving a sample-wise difference value relative to certain adjacent samples and coding the sample-wise difference value with an entropy coder.

Entropy coding/decoding may be performed in many ways. For example, context-based coding/decoding may be applied, where in both the encoder and the decoder modify the context state of a coding parameter based on previously coded/decoded coding parameters. Context-based coding may for example be context adaptive binary arithmetic coding (CABAC) or context-based variable length coding (CAVLC) or any similar entropy coding. Entropy coding/decoding may alternatively or additionally be performed using a variable length coding scheme, such as Huffman coding/decoding or Exp-Golomb coding/decoding. Decoding of coding parameters from an entropy-coded bitstream or codewords may be referred to as parsing.

The phrase along the bitstream (e.g. indicating along the bitstream) may be defined to refer to out-of-band transmission, signalling, or storage in a manner that the out-of-band data is associated with the bitstream. The phrase decoding along the bitstream or alike may refer to decoding the referred out-of-band data (which may be obtained from out-of-band transmission, signalling, or storage) that is associated with the bitstream. For example, an indication along the bitstream may refer to metadata in a container file that encapsulates the bitstream.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team-Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range, three-dimensional, and screen content coding extensions which may be abbreviated SHVC, MV-HEVC, REXT, 3D-HEVC, and SCC, respectively.

Versatile Video Coding (VVC) (MPEG-I Part 3), a.k.a. ITU-T H.266, is a video compression standard developed by the Joint Video Experts Team (JVET) of the Moving Picture Experts Group (MPEG), (formally ISO/IEC JTC1 SC29 WG11) and Video Coding Experts Group (VCEG) of the International Telecommunication Union (ITU) to be the successor to HEVC/H.265.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUS).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HEVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1-1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as case of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) or along a coded unit of a bitstream (e.g. indicating along a coded tile) may be used in claims and described embodiments to refer to out-of-band transmission, signaling, or storage in a manner that the out-of-band data is associated with the bitstream or the coded unit, respectively. The phrase decoding along the bitstream or along a coded unit of a bitstream or alike may refer to decoding the referred out-of-band data (which may be obtained from out-of-band transmission, signaling, or storage) that is associated with the bitstream or the coded unit, respectively.

A SEI NAL unit may contain one or more SEI messages, which are not required for the decoding of output pictures but may assist in related processes, such as picture output timing, rendering, error detection, error concealment, and resource reservation.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

In H.264/AVC, a coded video sequence is defined to be a sequence of consecutive access units in decoding order from an IDR access unit, inclusive, to the next IDR access unit, exclusive, or to the end of the bitstream, whichever appears earlier.

In HEVC, a coded video sequence (CVS) may be defined, for example, as a sequence of access units that consists, in decoding order, of an IRAP access unit with NoRaslOutputFlag equal to 1, followed by zero or more access units that are not IRAP access units with NoRaslOutputFlag equal to 1, including all subsequent access units up to but not including any subsequent access unit that is an IRAP access unit with NoRaslOutputFlag equal to 1. An IRAP access unit may be defined as an access unit in which the base layer picture is an IRAP picture. The value of NoRaslOutputFlag is equal to 1 for each IDR picture, each BLA picture, and each IRAP picture that is the first picture in that particular layer in the bitstream in decoding order, is the first IRAP picture that follows an end of sequence NAL unit having the same value of nuh_layer_id in decoding order. There may be means to provide the value of HandleCraAsBlaFlag to the decoder from an external entity, such as a player or a receiver, which may control the decoder. HandleCraAsBlaFlag may be set to 1 for example by a player that seeks to a new position in a bitstream or tunes into a broadcast and starts decoding and then starts decoding from a CRA picture. When HandleCraAsBlaFlag is equal to 1 for a CRA picture, the CRA picture is handled and decoded as if it were a BLA picture.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

In many coding modes of H.264/AVC and HEVC, the reference picture for inter prediction is indicated with an index to a reference picture list. The index may be coded with variable length coding, which usually causes a smaller index to have a shorter value for the corresponding syntax element. In H.264/AVC and HEVC, two reference picture lists (reference picture list 0 and reference picture list 1) are generated for each bi-predictive (B) slice, and one reference picture list (reference picture list 0) is formed for each inter-coded (P) slice.

Many coding standards, including H.264/AVC and HEVC, may have decoding process to derive a reference picture index to a reference picture list, which may be used to indicate which one of the multiple reference pictures is used for inter prediction for a particular block. A reference picture index may be coded by an encoder into the bitstream is some inter coding modes or it may be derived (by an encoder and a decoder) for example using neighboring blocks in some other inter coding modes.

Motion parameter types or motion information may include but are not limited to one or more of the following types:
- an indication of a prediction type (e.g. intra prediction, uni-prediction, bi-prediction) and/or a number of reference pictures;
- an indication of a prediction direction, such as inter (a.k.a. temporal) prediction, inter-layer prediction, inter-view prediction, view synthesis prediction (VSP), and inter-component prediction (which may be indicated per reference picture and/or per prediction type and where in some embodiments inter-view and view-synthesis prediction may be jointly considered as one prediction direction) and/or
- an indication of a reference picture type, such as a short-term reference picture and/or a long-term reference picture and/or an inter-layer reference picture (which may be indicated e.g. per reference picture)
- a reference index to a reference picture list and/or any other identifier of a reference picture (which may be indicated e.g. per reference picture and the type of which may depend on the prediction direction and/or the reference picture type and which may be accompanied by other relevant pieces of information, such as the reference picture list or alike to which reference index applies);
- a horizontal motion vector component (which may be indicated e.g. per prediction block or per reference index or alike);
- a vertical motion vector component (which may be indicated e.g. per prediction block or per reference index or alike);
- one or more parameters, such as picture order count difference and/or a relative camera separation between the picture containing or associated with the motion parameters and its reference picture, which may be used for scaling of the horizontal motion vector component and/or the vertical motion vector component in one or more motion vector prediction processes (where said one or more parameters may be indicated e.g. per each reference picture or each reference index or alike);
- coordinates of a block to which the motion parameters and/or motion information applies, e.g. coordinates of the top-left sample of the block in luma sample units;
- extents (e.g. a width and a height) of a block to which the motion parameters and/or motion information applies.

In comparison to the previous video coding standards, Versatile Video Codec (H.266/VVC) introduces a plurality of new coding tools, such as the following:
Intra prediction
　67 intra mode with wide angles mode extension
　Block size and mode dependent 4 tap interpolation filter
　Position dependent intra prediction combination (PDPC)
　Cross component linear model intra prediction (CCLM)
　Multi-reference line intra prediction
　Intra sub-partitions
　Weighted intra prediction with matrix multiplication
Inter-picture prediction
　Block motion copy with spatial, temporal, history-based, and pairwise average merging candidates
　Affine motion inter prediction
　sub-block based temporal motion vector prediction
　Adaptive motion vector resolution
　8×8 block-based motion compression for temporal motion prediction
　High precision (1/16 pel) motion vector storage and motion compensation with 8-tap interpolation filter for luma component and 4-tap interpolation filter for chroma component
　Triangular partitions
　Combined intra and inter prediction
　Merge with MVD (MMVD)
　Symmetrical MVD coding
　Bi-directional optical flow
　Decoder side motion vector refinement
　Bi-prediction with CU-level weight
Transform, quantization and coefficients coding
　Multiple primary transform selection with DCT2, DST7 and DCT8
　Secondary transform for low frequency zone
　Sub-block transform for inter predicted residual
　Dependent quantization with max QP increased from 51 to 63
　Transform coefficient coding with sign data hiding
　Transform skip residual coding
Entropy Coding
　Arithmetic coding engine with adaptive double windows probability update
In loop filter
　In-loop reshaping
　Deblocking filter with strong longer filter
　Sample adaptive offset
　Adaptive Loop Filter
Screen content coding:
　Current picture referencing with reference region restriction
360-degree video coding
　Horizontal wrap-around motion compensation
High-level syntax and parallel processing
　Reference picture management with direct reference picture list signalling
　Tile groups with rectangular shape tile groups Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:
　Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.
　Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.
　Bit-depth scalability: Base layer pictures are coded at lower bit-depth (e.g. 8 bits) than enhancement layer pictures (e.g. 10 or 12 bits).
　Dynamic range scalability: Scalable layers represent a different dynamic range and/or images obtained using a different tone mapping function and/or a different optical transfer function.
　Chroma format scalability: Base layer pictures provide lower spatial resolution in chroma sample arrays (e.g. coded in 4:2:0 chroma format) than enhancement layer pictures (e.g. 4:4:4 format).
　Color gamut scalability: enhancement layer pictures have a richer/broader color representation range than that of the base layer pictures-for example the enhancement layer may have UHDTV (ITU-R BT.2020) color gamut and the base layer may have the ITU-R BT.709 color gamut.
　View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

Region-of-interest scalability (as described below).

Interlaced-to-progressive scalability (also known as field-to-frame scalability): coded interlaced source content material of the base layer is enhanced with an enhancement layer to represent progressive source content. The coded interlaced source content in the base layer may comprise coded fields, coded frames representing field pairs, or a mixture of them. In the interlace-to-progressive scalability, the base-layer picture may be resampled so that it becomes a suitable reference picture for one or more enhancement-layer pictures.

Hybrid codec scalability (also known as coding standard scalability): In hybrid codec scalability, the bitstream syntax, semantics and decoding process of the base layer and the enhancement layer are specified in different video coding standards. Thus, base layer pictures are coded according to a different coding standard or format than enhancement layer pictures. For example, the base layer may be coded with H.264/AVC and an enhancement layer may be coded with an HEVC multi-layer extension.

For example in the above mentioned spatial, bit-depth and chroma format scalability cases, base layer information could be used to code enhancement layer to minimize the additional bitrate overhead.

Scalability can be enabled at least in two basic ways: by introducing new coding modes for performing prediction of pixel values or syntax from lower layers of the scalable representation or by placing the lower layer pictures to the reference picture buffer (decoded picture buffer, DPB) of the higher layer. The first approach may be more flexible and thus can provide better coding efficiency in most cases. However, the second, reference frame based scalability, approach may be implemented very efficiently with minimal changes to single layer codecs while still achieving majority of the coding efficiency gains available. In accordance with an approach, a reference frame based scalability codec can be implemented by utilizing the same hardware or software implementation for all the layers, just taking care of the DPB management by external means.

In order to be able to utilize parallel processing, images can be split into independently codable and decodable image segments (slices or tiles). Slices typically refer to image segments constructed of certain number of basic coding units that are processed in default coding or decoding order, while tiles typically refer to image segments that have been defined as rectangular image regions that are processed at least to some extend as individual frames.

Typically, video is encoded in YUV or YCbCr color space as that is found to reflect some characteristics of human visual system and allows using lower quality representation for Cb and Cr channels as human perception is less sensitive to the chrominance fidelity those channels represent.

Cross-component linear model prediction is used for example in the VVC/H.266 video codec. In that variant, there are three chroma prediction modes using cross-component linear model prediction. One of those can be selected as prediction mode for the chroma prediction blocks by encoder and signaled in the bitstream to the decoder. The difference between the three modes is the set of reference samples used for generating parameters for the linear model. One of the modes uses only samples above the prediction block; one of the models uses only samples left of the prediction block; and one of the modes uses samples both above and left of the prediction block. In order to keep the complexity of the parameter generation low, the parameters are calculated using only a subset of the reference samples available on the block boundaries.

The cross-component linear model prediction of VVC/H.266 applies the following formula to perform the prediction (or mapping) of a luma sample value lumaVal to a predicted chroma sample value chromaVal:

$$chromaVal = ((lumaVal * a) >> k) + b$$

where parameters a and k determine the slope of the linear model and b the offset value of the linear model. The notation ">>" is used to denote a bit shifting operation to right which corresponds with division by powers of two. Parameters a, k and b are determined using the determined set of available reference samples.

An example of using linear regression to calculate the linear model parameters is given in the JVET (Joint Video Experts Team) contribution JVET-D0110. In that implementation there can be two linear models operating in different ranges of the luma spectrum.

In the following some example embodiments of the disclosure will be described in more detail.

First, some operations of an encoder will be explained. The encoder receives luminance and chrominance components of pixels of an image to be encoded. The image have been divided into smaller blocks, wherein the luminance and chrominance components of one image may be processed in block-by-block basis. Information of previously encoded and subsequently decoded blocks of the image or some of them may have been stored by the encoder to a reference frame memory (RFM), for example, to be used in prediction of subsequent images.

A linear model for mapping luma values to chroma values may be used to generate predicted chroma values based on decoded luma values. This kind of a model can be given as below using a slope parameter "a" and an offset parameter "b":

$$chromaVal = lumaVal * a + b$$

The encoder may encode in a bitstream the a slope parameter "a" and an offset parameter "b" and the decoder may obtain those parameters from the bitstream, or they may be initially known by the decoder, wherein only changes to those parameters may be signalled to the decoder.

Figure 5A:
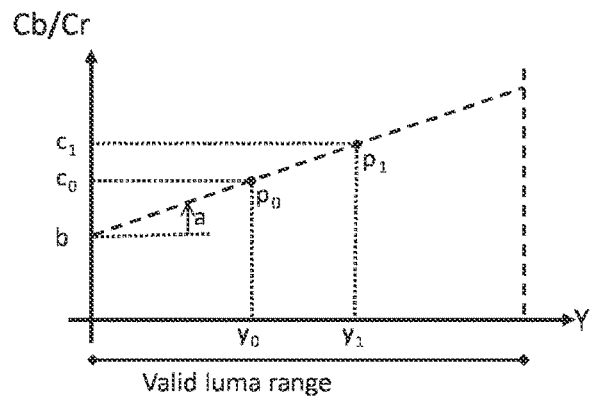
FIG. 5a illustrates a linear model mapping of luma values to chroma values, in accordance with an embodiment of the disclosure.

FIG. 5a is illustrating the mapping, in accordance with an embodiment of the disclosure. Each valid luma sample value can be mapped to a chroma sample value using the model. In this example, two points or two luma-chroma pairs p0 and p1 with luma values y0 and y1 and chroma values c0 and c1 define the slope parameter a and offset parameter b for the mapping function. In practical implementations which use integer arithmetic, the equation may also include a scaling parameter "k" defining the basis or precision of the slope parameter a:

$$chromaVal = ((lumaVal * a) >> k) + b$$

Scaling parameter k can be selected during the process of generating the parameters of the model e.g. by the encoder, or it can also be indicated to a decoder in different ways, or a fixed k can be used for all the mappings an encoder performs. The parameter k is determining how many bits the result of the multiplication between the luma Val and slope parameter a is shifted down using the bitwise right shift operation » to reach the luma-chroma value space. In other words, the result is divided by $2^k$.

In an embodiment, an update term "u" for the slope parameter a is encoded in a bitstream by the encoder and received from the bitstream by the decoder, a reference point consisting of a luma-chroma value pair is determined and parameters a, k and b are updated by the decoder based on the update term and the reference point.

In an embodiment, an update term u for the slope parameter a is encoded in a bitstream by the encoder and received from the bitstream by the decoder, a reference luma value is determined and parameters a, k and b are updated by the decoder based on the update term and the reference luma value.

The update term u can have a different basis or precision "s" than the basis or precision k determined for the slope parameter a. For example, the update term u can have basis of 3 corresponding to shifting down the received update term u by 3 bits (or dividing it by $2^3=8$). As another example, the update term u can have basis of 4 corresponding to shifting down the received update term u by 4 bits (or dividing it by $2^4=16$). The basis can be either fixed, or it can be signalled in the bitstream, or it can be determined adaptively by the decoder for example as a function of the size of the block to be predicted or processed. As an example, the basis s can be larger corresponding to finer precision update term if the prediction block size is above a threshold and smaller if the prediction block size is below a threshold.

For adding the update term u to the slope parameter a, the bases of these parameters should be made equal. This can be achieved by either bitwise shifting u up until the bases of u matches with the bases of k, if k is larger than s, or shifting a up until the bases of u matches with the bases of k, if k is smaller than s.

In this example, the updated linear model with parameters a', k' and b' can be written as:

$$chromaVal = ((lumaVal * a') >> k') + b'$$

Updated linear model parameters can be calculated for example using the pseudo code below:

```
a, b, k, refLuma = estimateLinearModel( set of reference samples )
u = decodeUpdateTerm( bitstream )
k' = k
if (k < s)
{
    // Make the final shift at least the size of the precision of the update
    a = a << (s − k)
    k' = s
}
else if ( k > s )
    // The final shift is larger than the precision of the update: scale the update up to the final precision
    u = u << (k − s )
}
a' = a + u
b' = b − ( ( u * yr ) >> k')
```

The original linear model parameters a, b and k can be calculated for example by estimateLinearModel function following the process determined in H.266/VVC specification or in alternative ways, such as using linear regression. In addition to original parameters a, b and k, an additional reference luma parameter yr is determined and used as a reference value when calculating the updated offset parameter b'. The yr parameter can be determined in different ways. For example if two luma-chroma pairs are used to calculate the linear model, yr can be set to the average of the luma values of those pairs. If four luma-chroma pairs are used to calculate the linear model, yr can be, for example, set to average of the largest and the smallest luma values of those pairs; or yr can be set to the average of the second largest and the third largest of luma values of those pairs; or yr can be set to the average of the luma values of those four pairs. As further examples, the yr can be calculated as the average of the luma values in a determined set of reference luma-chroma pairs or luma reference values, a median of those values, or average of the maximum and minimum of those values, or in other ways. The way the yr is calculated can also be determined based on bitstream signalling. For example, it can be signalled if an average of determined luma reference samples is used as yr, or if the yr is calculated as a weighted average of a set of reference luma values and what those weights are. In addition or instead of using traditional reference values obtained from outside of the block borders, the determination of the yr parameter can include reconstructed luma values inside the prediction block or prediction unit.

Figure 5B:
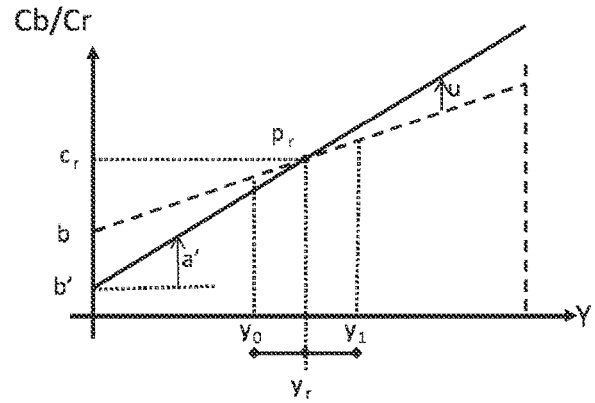
FIG. 5b illustrates an updated mapping.

FIG. 5b is illustrating an updated mapping. The update term u is applied to the slope of the mapping using a reference point pr with luma value yr as a control point with respect to which the mapping is rotated. The updated slope parameter a' and the updated offset parameter b' are now defining the new mapping. The scale parameters k and s are omitted for simpler illustration.

Figure 5C:
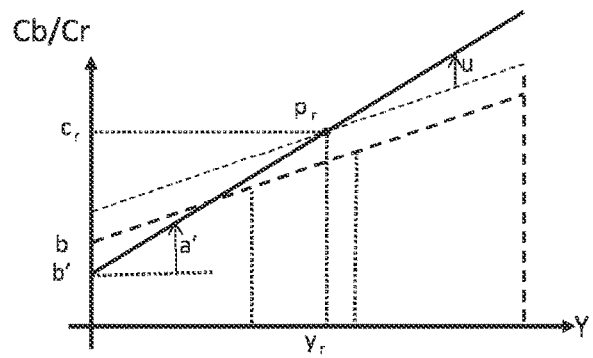
FIG. 5c illustrates selecting a control point pr outside of a determined initial mapping line and performing a slope update with respect to such a point.

FIG. 5c illustrates selecting a control point pr outside of the determined initial mapping line and performing the slope update with respect to such a point. In this case the offset parameter b should be updated accordingly. For example, if pr is certain amount of chroma values above the mapping line, b' should be raised with the same amount. Alternatively, the b' can be calculated using the updated slope parameter a' and the coordinates of the control point pr. This can be done for example as follows using the luma value yr and chroma value cr of the control point pr:

$$b' = cr - ((a' * yr) >> k')$$

Figure 5D:
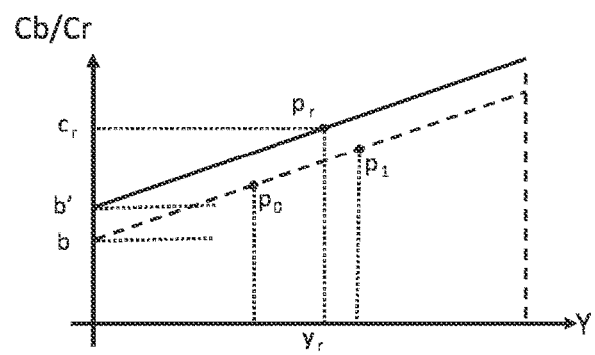
FIG. 5d illustrates using a control point pr outside of the determined initial mapping line and performing only update on offset parameter b while keeping the slope unchanged.

FIG. 5d illustrates using a control point pr outside of the determined initial mapping line and performing only update on offset parameter b while keeping the slope unchanged. In this alternative the slope parameter is calculated based on two or more luma-chroma value pairs, or control points. In addition an extra control point pr is calculated by using a different or the same set of reference luma-chroma pairs. For example, an average luma value of a set or reference luma values can be used as the luma value yr of the control point pr; and an average chroma value of a set or reference chroma values can be used as the chroma value cr of the control point pr. The set of reference chroma values can include, as an example, all the values of reconstructed border chroma samples immediately above the block and immediately left of the block. The set of reference luma values can be corresponding luma sample values that may be obtained e.g. by interpolation if the chroma and luma resolutions differ. The border chroma samples can include samples directly above and to the left of the block, but can also include extensions of those arrays. For example, the set of border samples above a block the width of which is w can include w samples neighboring the block, or it can include 2*w samples including also w additional samples on the same row of the first w samples immediately above the block. The updated offset value b' can then be calculated using the reference luma value yr and the reference chroma value cr as follows:

$$b' = cr - ((a * yr) >> k)$$

Advantageously, the set of reference luma and chroma values for calculating the slope parameter a is selected to be smaller than the set of reference luma and chroma values for calculating the cr and yr parameters for generating the offset parameter b'. With this selection the computation complexity of calculating the first order slope parameter a can be kept low while the relatively straight-forward calculation of cr and yr can be performed more accurately, for example by determining cr and cy by averaging the reference chroma values to produce er and averaging the reference luma values to produce yr.

The set of reference luma and chroma values for calculating the bias term b' of a linear model can be advantageously selected to be a superset of the reference luma and chroma values used to calculate the slope parameter a of the linear model. This can lower the computation complexity associated with determining the linear model as the already generated or fetched reference samples can be used in determining the bias term b', while improving the accuracy and stability of the offset parameter b' as a larger set of reference samples is made available for calculating it.

Figure 6A:
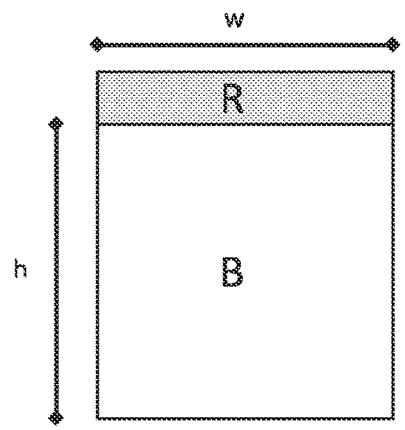
FIGS. 6a to 6c illustrate different selections for reference samples R above a block B, in accordance with an embodiment of the disclosure.
Figure 6B:
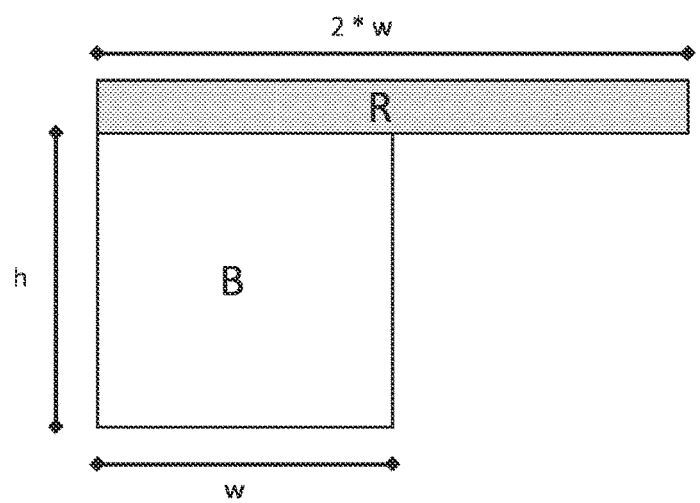
Figure 6C:
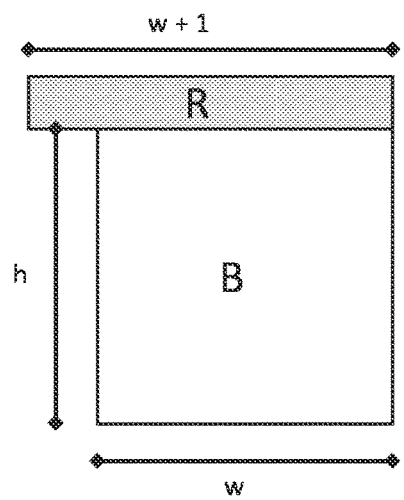

FIGS. 6a to 6c illustrate different selections for reference samples R above the block B. FIG. 6a shows a set of reference samples selected immediately above the block. The example in FIG. 6b shows extending the set of reference samples to also include additional samples to the top-right of the block and FIG. 6c demonstrates extending the reference sample array by one sample to the left. Naturally also other selections can be made, for example including 2*w+1 samples to the set. Similar selections can be made left side of the block B and combinations of samples or sample arrays from the left and above the block can also be used.

Figure 7A:
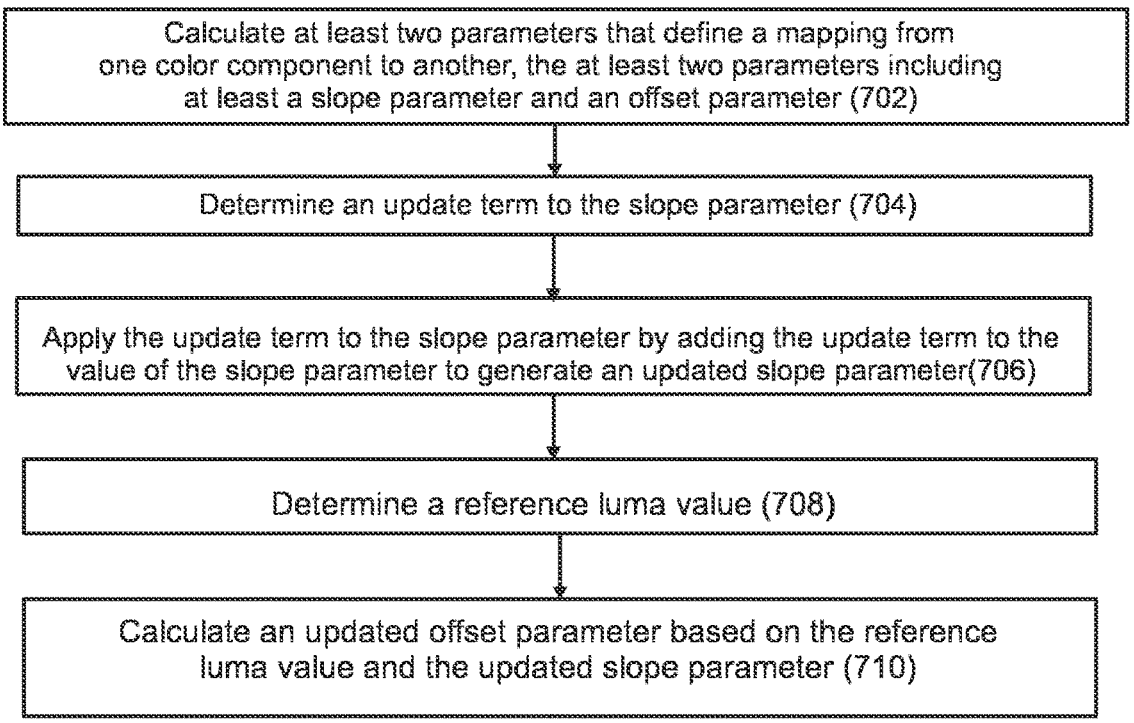
FIG. 7a shows a flow chart of a method according to an embodiment of the invention.

In an embodiment, a video or image decoder performs the following steps, with reference to the flow diagram of FIG. 7a:

The decoder calculates (702) at least two parameters that define a mapping from one color component to another, the at least two parameters including at least a slope parameter and an offset parameter and determines (704) an update term to the slope parameter. Then the decoder applies (706) the update term to the slope parameter by adding the update term to the value of the slope parameter to generate an updated slope parameter after which the decoder determines (708) a reference luma value. Based on the reference luma value and the updated slope parameter the decoder calculates (710) an updated offset parameter.

Figure 7B:
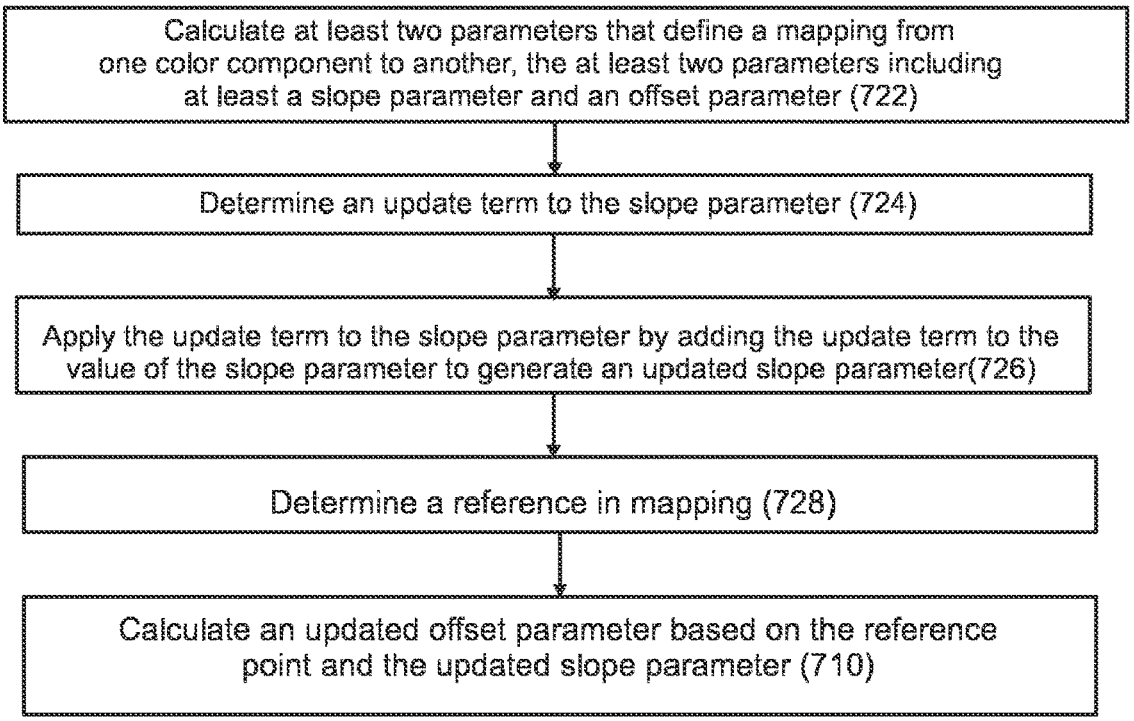
FIG. 7b shows a flow chart of a method according to another embodiment of the invention.

In an embodiment, a video or image decoder performs the following steps, with reference to the flow diagram of FIG. 7b:

The decoder calculates (722) at least two parameters that define a mapping from one color component to another, the at least two parameters including at least a slope parameter and an offset parameter and determines (724) an update term to the slope parameter. Then the decoder applies (726) the update term to the slope parameter by adding the update term to the value of the slope parameter to generate an updated slope parameter and determines (728) a reference point in mapping. Based on the reference point and the updated slope parameter the decoder calculates (730) an updated offset parameter.

The calculation of the parameters defining a mapping of the values of one color component to the values of other color component can be done in different ways. For example, linear regression or other statistical methods can be used to minimize the error a model may create for a set of reference samples. The reference samples can be obtained from the borders of a block that is to be predicted or using another set of data. There can also be multiple candidate reference sets from which an encoder pics one and indicates the selection to a decoder in a bitstream. A subset of the border samples or other sample sets can also be used. In such a case there could be for example four sample pairs selected from the available reference samples, each sample pair consisting of a luma sample and a corresponding chroma sample. The two pairs with the lowest luma values of the four pairs could form a first set and the two pairs with the highest luma values could form a second set. Luma values of the first set could be averaged to form the first average luma value, and chroma values of the first set could be averaged to form the first average chroma value. Similarly, luma values of the second set could be averaged to form the second average luma value, and chroma values of the second set could be averaged to form the second average chroma value. Now the linear model parameters could be calculated from the two average luma values and the two average chroma values, as in H.266/VVC standard.

The update term to the slope value can be determined in different ways. For example, a video encoder can use rate-distortion optimization techniques to determine a suitable update term to the slope value. A video decoder can determine the update term to the slope value by parsing it from a bitstream, predicting it, or by a combination of a prediction and bitstream signalling, or by other means.

The update term to the slope value can be scaled to the same basis with the calculated slope value a, or the calculated slope value a can be scaled to the same basis with the update term, or both values can be scaled to a third basis, or scaling can be omitted. The third basis can be, for example, determined by the allowed maximum values of the basis used for the update term and the slope parameter.

The update term can be limited to a certain range. For example, the update term can be defined to have integer values ranging from −3 to 3, or from −4 to 4, or from −N to N, or from N to M. Where N and M can be constants or determined by various means. For example, those can be determined based on characteristics of the block to be predicted, coded or decoded, such as the size of the block.

In an embodiment there is a pre-determined set of update terms that can be signalled in a bitstream and decoded by a decoder.

In an embodiment the set of update terms that can be signalled in a bitstream and decoded by a decoder depends of characteristics of a block of samples, such as the size of the block.

In an embodiment the offset term b' in a linear mode is calculated as: b'=cr−((a*yr)»k), where cr is the average of the border chroma values above the block, yr is the average of the border luma values above the block, a is a slope parameter and k is a shifting parameter.

In an embodiment the offset term b' in a linear mode is calculated as: b'=cr−((a*yr)»k), where cr is the average of the border chroma values left of the block, yr is the average of the border luma values left of the block, a is a slope parameter and k is a shifting parameter.

In an embodiment the offset term b'in a linear mode is calculated as: b'=cr−((a*yr)»k), where cr is the average of the border chroma values left and above of the block, yr is the average of the border luma values left and above of the block, a is a slope parameter and k is a shifting parameter.

In an embodiment the set of reference luma and chroma values for calculating the cr and yr parameters for determining the offset parameter b' is selected to be larger than the set of reference luma and chroma values for calculating the slope parameter a.

In an embodiment the set of reference luma and chroma values for calculating the cr and yr parameters for determining the offset parameter b' is selected to be a superset of the set of reference luma and chroma values for calculating the slope parameter a.

The update term can be predicted by different means and the difference between the actual update term and the predicted update term can be encoded to a bitstream or decoded from a bitstream. Such prediction means could include determination of the predicted update term from update terms or other parameters of the spatially or temporally neighboring blocks, other blocks within the same or different pictures, or blocks of different color components or channels.

Update terms for different color components can be indicated separately or jointly. Those can also be indicated partially jointly, e.g. by having a joint bitstream flag indicating if there is a non-zero update term for any of the chroma components. In the case this indication imply presence of an update term for chroma components, it can further be indicated if one or both chroma components have a non-zero update term and in the case only one has the non-zero update term, which one of the components the non-zero update term is. Alternatively, in the case the indication imply presence of an update term for chroma components, it can further be indicated if the first chroma component has a non-zero update term and conditionally to that signalling implying the non-zero update term for the first chroma component, also indicate if the second chroma component has also a non-zero update term. In this example, the indication for the presence of an update term for the second chroma component can be omitted if the first chroma component had no non-zero update terms associated with it.

Determining the reference luma value or the reference point can be done in different ways. For example, the reference luma value can be an average of the two luma values used in determining the slope parameter of a linear model; or it can be a weighted average of such luma value; or determined in other ways.

There can be multiple linear models forming the mapping from luma to chroma values. For example, a first linear model can be used if the luma value is below a threshold value and a second model if luma value is larger than or equal to the threshold value. In such case, each of the linear models can receive their independent update terms based on bitstream signalling. Also it can be signalled that only a certain subset of the linear models are updated using a signalled update term or update terms. Also the same update term can be determined to be used for multiple models based on bitstream signalling or other means. In such case, it may further be determined how to apply the signalled update term to different models. For example, the same update term can be used for two models, or a negative version of the update term can be used for one and a positive version of the update term can be used for the other model.

Although the mapping process and the parameter update process is described here as having luma values as input and chroma values as output, the input and output are not restricted to such color components. For example, the same process can be applied between chroma channels, with one chroma channel, such as the Cb channel, as the input and another chroma channel, such as the Cr channel, as the output. As a further example, the input channel can be a luma channel and the output channel can be an auxiliary information channel consisting, for example, of depth, distance, disparity, transparency or other types of values.

According to an embodiment, the chroma blocks may also correspond to any of the red, green, or blue color components of the RGB color space.

An apparatus according to an aspect comprises means for calculating at least two parameters that define a mapping from a first color component to a second color component, the at least two parameters including at least a slope parameter and an offset parameter; means for determining an update term to the slope parameter; means for applying the update term to the slope parameter by adding the update term to the value of the slope parameter to generate an updated slope parameter; means for determining a reference value of first color component; and means for calculating an updated offset parameter based on the reference value of the first color component and the updated slope parameter.

As a further aspect, there is provided an apparatus comprising: at least one processor and at least one memory, said at least one memory stored with code thereon, which when executed by said at least one processor, causes the apparatus to perform at least: calculate at least two parameters that define a mapping from a first color component to a second color component, the at least two parameters including at least a slope parameter and an offset parameter; determine an update term to the slope parameter; apply the update term to the slope parameter by adding the update term to the value of the slope parameter to generate an updated slope parameter; determine a reference value of first color component; and calculate an updated offset parameter based on the reference value of the first color component and the updated slope parameter.

Such apparatuses may comprise e.g. the functional units disclosed in any of the FIGS. 1, 2, 4a, and 4b for implementing the embodiments.

Such an apparatus further comprises code, stored in said at least one memory, which when executed by said at least one processor, causes the apparatus to perform one or more of the embodiments disclosed herein.

Figure 8:
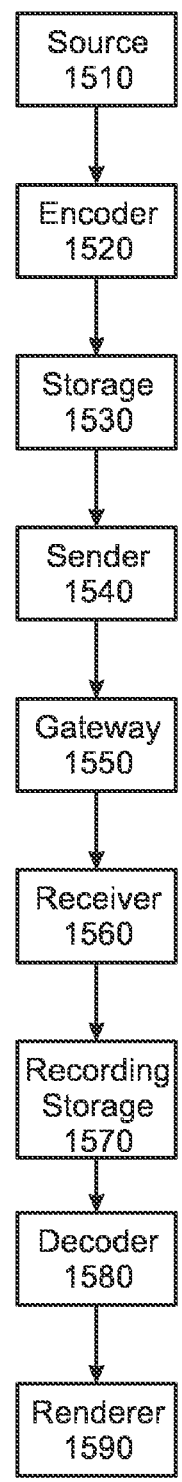
FIG. 8 shows a schematic diagram of an example multimedia communication system within which various embodiments may be implemented.

FIG. 8 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage

1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, view switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described with reference to and/or using terminology of HEVC and/or VVC. It needs to be understood that embodiments may be similarly realized with any video encoder and/or video decoder.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder. For example, some embodiments have been described related to generating a prediction block as part of encoding. Embodiments can be similarly realized by generating a prediction block as part of decoding, with a difference that coding parameters, such as the horizontal offset and the vertical offset, are decoded from the bitstream than determined by the encoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this disclosure.

The invention claimed is:

1. An apparatus comprising at least one processor and at least one memory comprising computer program code, the at least one memory and the computer program code configured to, with the at least one processor, cause the apparatus to:
   calculate at least two parameters that define a mapping from a first color component to a second color component, the at least two parameters comprising a slope parameter and an offset parameter;
   determine an update term to the slope parameter;
   apply the update term to the slope parameter by adding the update term to the value of the slope parameter to generate an updated slope parameter;
   determine a reference value of first color component; and
   calculate an updated offset parameter based on the reference value of the first color component and the updated slope parameter;
   wherein the calculation of the updated offset parameter comprises subtracting from the offset parameter a product of the update term and the reference value of the first color component: and
   wherein the calculation of the updated offset parameter is according to: $b'=b-((u*yr)\gg k')$, wherein $b'$ is the updated offset parameter, $b$ is the offset parameter, $u$ is the update term, $yr$ is the reference value of the first color component, and $k'$ is a shifting parameter.

2. The apparatus according to claim 1, wherein the apparatus upon execution is further caused to:
   determine a reference point comprising a value pair of the first color component and the second color component; and
   update the slope parameter and the offset parameter based on the update term and the reference point.

3. The apparatus according to claim 1, wherein the apparatus upon execution is further caused to:
   select a control point from a line determined by the slope parameter and the offset parameter.

4. The apparatus according to claim 2, wherein the apparatus upon execution is further caused to:
   select a control point outside of a line determined by the slope parameter and the offset parameter.

5. The apparatus according to claim 1, wherein the apparatus upon execution is further caused to:
   determine an additional reference value of the first color component; and
   use the additional reference value to update the offset parameter.

6. The apparatus according to claim 5, wherein
   the apparatus is further configured to use a plurality of pairs of values of the first color component and the second color component to determine the slope parameter and the offset parameter to cause calculating at least two parameters that define a mapping; and
   the apparatus is further configured to use a combination of two or more values of the first color component of the pairs of values to cause determine an additional reference value.

7. The apparatus according to claim 1, wherein the apparatus comprising a pre-determined set of update terms further caused to
   signal the update term in a bitstream.

8. The apparatus according to claim 7, wherein the set of update terms is signaled in the bitstream depends on characteristics of a block of samples.

9. The apparatus according to claim 1, wherein the apparatus upon execution is further caused to:
receive the update term from a bitstream.

10. The apparatus according to claim 1, wherein the apparatus upon execution further caused to:
use linear model mapping for mapping luma values to chroma values to generate predicted chroma values based on decoded luma values.

11. A method comprising:
calculating at least two parameters that define a mapping from a first color component to a second color component, the at least two parameters comprising a slope parameter and an offset parameter;
determining an update term to the slope parameter;
applying the update term to the slope parameter by adding the update term to the value of the slope parameter to generate an updated slope parameter;
determining a reference value of first color component; and
calculating an updated offset parameter based on the reference value of the first color component and the updated slope parameter;
wherein the calculating of the updated offset parameter comprises subtracting from the offset parameter a product of the update term and the reference value of the first color component; and
wherein the calculating of the updated offset parameter is according to; $b'=b-((n*yr)\gg k')$, wherein b' is the updated offset parameter, b is the offset parameter, u is the update term, yr is the reference value of the first color component, and k' is a shifting parameter.

12. The method according to claim 11, further comprising
determining a reference point comprising a value pair of the first color component and the second color component; and
updating the slope parameter and the offset parameter based on the update term and the reference point.

13. The method according to claim 11, further comprising
selecting a control point from a line determined by the slope parameter and the offset parameter.

14. The method according to claim 11, further comprising
selecting a control point outside of a line determined by the slope parameter and the offset parameter.

15. The method according to any of claims 11, further comprising
determining an additional reference value of the first color component; and
using the additional reference value to update the offset parameter.

16. The method according to claim 15, further comprising
calculating at least two parameters that define a mapping, by using a plurality of pairs of values of the first color component and the second color component to determine the slope parameter and the offset parameter; and
determining an additional reference value are by using a combination of two or more values of the first color component of the pairs of values.

17. The method according to claim 11, wherein the reference value of the first color component is:
an average of border luma values left of a current block,
an average of border luma values above of the current block, or
an average of border luma values left of and above the current block.

18. The apparatus according to claim 1, wherein the reference value of the first color component is:
an average of border luma values left of a current block,
an average of border luma values above of the current block, or
an average of border luma values left of and above the current block.

19. A non-transitory program storage device readable by an apparatus, tangibly embodying a program of instructions executable with the apparatus for performing operations, the operations comprising:
calculating at least two parameters that define a mapping from a first color component to a second color component, the at least two parameters comprising a slope parameter and an offset parameter;
determining an update term to the slope parameter;
applying the update term to the slope parameter by adding the update term to the value of the slope parameter to generate an updated slope parameter;
determining a reference value of first color component; and
calculating an updated offset parameter based on the reference value of the first color component and the updated slope parameter;
wherein the calculating of the updated offset parameter comprises subtracting from the offset parameter a product of the update term and the reference value of the first color component; and
wherein the calculating of the updated offset parameter is according to; $b'=b-(u* yr)\gg k')$, wherein b' is the updated offset parameter, b is the offset parameter, u is the slope parameter, yr is the reference value of the first color component, and k' is a shifting parameter.

20. The non-transitory program storage device according to claim 19, wherein the reference value of the first color component is:
an average of border luma values left of a current block,
an average of border luma values above of the current block, or
an average of border luma values left of and above the current block.

* * * * *